United States Patent
Nielsen

(10) Patent No.: US 7,699,578 B2
(45) Date of Patent: Apr. 20, 2010

(54) METHOD AND DEVICE FOR FORMING BUNDLES OF STACKABLE OBJECTS

(75) Inventor: Erik Vind Nielsen, Esbjerg (DK)

(73) Assignee: Müller Martini Holding AG, Hergiswil (CH)

( * ) Notice: Subject to any disclaimer, the term of this patent is extended or adjusted under 35 U.S.C. 154(b) by 0 days.

(21) Appl. No.: 11/488,085

(22) Filed: Jul. 18, 2006

(65) Prior Publication Data

US 2007/0031235 A1 Feb. 8, 2007

(30) Foreign Application Priority Data

Jul. 19, 2005 (EP) .................. 05405445

(51) Int. Cl.
*B65H 29/26* (2006.01)
*B07B 13/00* (2006.01)

(52) U.S. Cl. .................. 414/793.8; 414/791.1; 209/659

(58) Field of Classification Search .................. 209/651, 209/653, 659; 198/370.02; 414/793–796, 414/793.8, 788.9, 790.9, 791, 791.1; 53/155, 53/447, 504

See application file for complete search history.

(56) References Cited

U.S. PATENT DOCUMENTS

| | | | | |
|---|---|---|---|---|
| 3,361,247 A | * | 1/1968 | Lauzon et al. | 198/350 |
| 3,799,540 A | * | 3/1974 | Buccicone | 271/189 |
| 4,820,104 A | | 4/1989 | Kwauka | |
| 4,836,386 A | * | 6/1989 | Smith | 209/564 |
| 4,905,843 A | * | 3/1990 | Holbert | 209/571 |
| 4,934,687 A | * | 6/1990 | Hayden et al. | 271/202 |
| 5,138,817 A | * | 8/1992 | Mowry et al. | 53/399 |
| 5,181,820 A | * | 1/1993 | Sjogren et al. | 414/397 |
| 5,503,388 A | * | 4/1996 | Guenther et al. | 271/300 |
| 5,620,102 A | * | 4/1997 | Finch, Jr. | 209/583 |
| 6,781,078 B2 | * | 8/2004 | Das et al. | 209/586 |
| 2002/0106273 A1 | * | 8/2002 | Huang et al. | 414/788.1 |
| 2003/0033788 A1 | | 2/2003 | Van Dam | |

FOREIGN PATENT DOCUMENTS

| EP | 0 453 806 | 10/1991 |
|---|---|---|
| EP | 0 487 837 | 6/1992 |
| EP | 1 348 653 | 10/2003 |
| EP | 1 491 477 | 12/2004 |

* cited by examiner

*Primary Examiner*—Gregory W Adams
(74) *Attorney, Agent, or Firm*—Venable LLP; Robert Kinberg; Steven J. Schwartz

(57) ABSTRACT

A method for forming bundles from stackable objects includes supplying the stackable objects with a first conveying apparatus from above to a shaft of a stacking device to form bundles of the stackable objects inside the shaft of the stacking device. The bundles are transported from a lower section of the shaft of the stacking device with a second conveying apparatus.

14 Claims, 4 Drawing Sheets

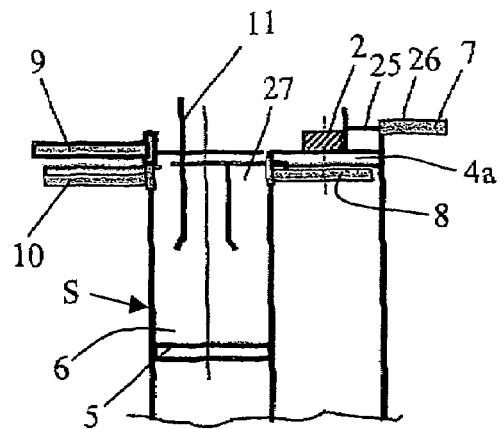
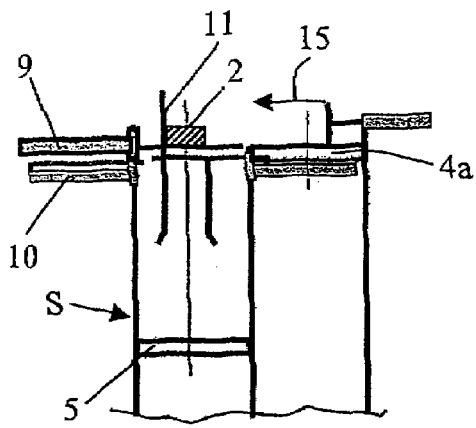
Fig. 3a    Fig. 3b
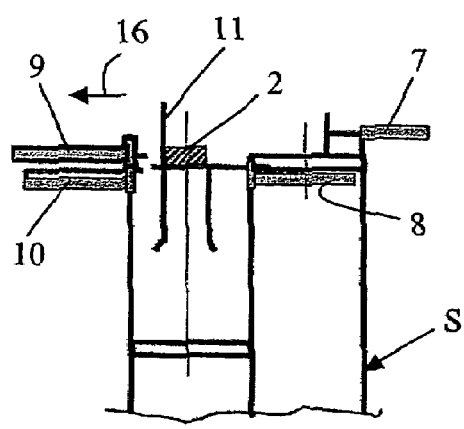
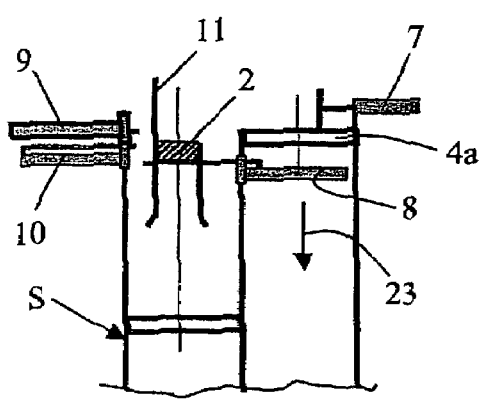
Fig. 3c    Fig. 3d
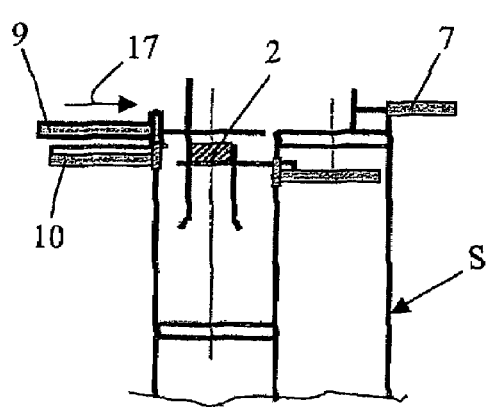
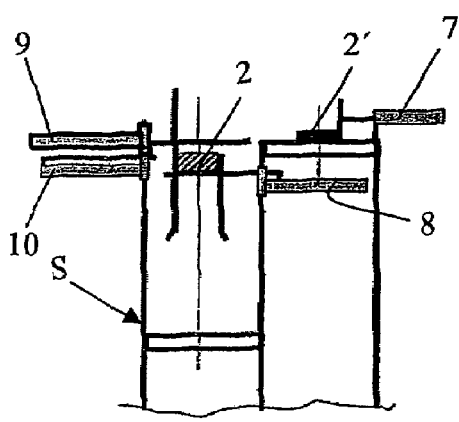
Fig. 3e    Fig. 3f

METHOD AND DEVICE FOR FORMING BUNDLES OF STACKABLE OBJECTS

CROSS-REFERENCE TO RELATED APPLICATIONS

This application claims the priority of European Patent Application No: 05405445.7, filed on Jul. 19, 2005, the subject matter of which is incorporated herein by reference together with each U.S. and foreign patent and patent application mentioned below.

BACKGROUND OF THE INVENTION

The invention relates to a method for forming bundles from stackable objects, involving at least one stacking device provided with a shaft, a conveying apparatus for feeding the stackable objects to the stacking device, and an additional conveying apparatus for transporting away the formed bundles. The invention furthermore relates to a device for forming bundles assembled from stackable objects.

Print products such as books, magazines, and brochures frequently must be combined into bundles and palletized. For the palletizing, it is important to ensure that a predetermined height is not exceeded and the formed stack is stable.

European Patent document EP 1 348 653 discloses a method for forming and palletizing bundles containing print products, for which partial bundles are lifted with the aid of a hoisting device from a conveying element and are subsequently lowered back down into the same plane. The completed bundles are supplied to a palletizer and deposited with a predetermined pattern on a pallet.

European patent document EP 1 491 477 A, commonly owned by the assignee of the present application, also discloses a method and a device for forming bundles, wherein the bundles are formed by lifting individual products with the aid of a stacking device from a conveying element, staggering these products with the aid of two lifting elements, and finally lowering the formed bundle once more to the plane of the aforementioned conveying element and transporting it away with a different conveying element.

SUMMARY OF THE INVENTION

It is an object of the present invention to provide a method and a device of the aforementioned type, which result in a higher bundle-forming capacity. It is a further object to provide such a device with a simple structural design. It is yet another object to provide such a device in a manner that is cost-effective to produce.

The above and other objects are achieved according to of the invention wherein there is provided in an exemplary embodiment a method for forming bundles from stackable objects, comprising: supplying the stackable objects with a first conveying apparatus from above to a shaft of a stacking device to form bundles of the stackable objects inside the shaft of the stacking device; and transporting the bundles from a lower section of the shaft of the stacking device with a second conveying apparatus.

With the method according to the invention, the bundles composed of stackable objects are thus conveyed from the top toward the bottom, meaning the stackable objects and/or the completely formed bundles need not be lifted up first and subsequently lowered back down. Rather, they are always conveyed in the same direction. On the one hand, this permits a simpler and more secure bundle forming while, on the other hand, it results in considerably higher capacity. It has turned out that even stackable objects with very different thicknesses can thus be assembled securely and reliably into bundles.

According to one modification of the invention, the thickness of the individual stackable objects is measured before these objects enter the shaft and the resulting measurements are then used to control the bundle formation. Owing to this thickness measurement and the aforementioned control, substantially uniform bundles can be formed even if the objects have different thicknesses. The palletizing can thus be optimized and can be automated with bundles of this type having an essentially uniform thickness.

According to one modification of the invention, the stackable objects are respectively moved from the first conveying apparatus to the stacking device in a direction transverse to the conveying direction of the first conveying apparatus. The conveying apparatus can be a conveying belt, for example, and the stackable objects can be supplied easily and quickly to the stacking device by a pushing device.

According to a different modification of the invention, the stackable objects or the formed partial bundles inside the shaft are lowered for the bundle formation by a distance that respectively matches the measured thickness of the stackable object to be added. The bundles are thus formed from the bottom upward, wherein the first object of the formed bundle is on the bottom and the object added last is on the top, resulting in an especially high capacity.

A modified embodiment of the invention provides that each partial bundle in the shaft is guided in substantially perpendicular direction from the top toward the bottom. The stackable objects, the partial bundles, and the completely formed bundles thus move inside the shaft from the top toward the bottom.

According to another modification of the invention, the stackable objects are conveyed by the first conveying apparatus along an upwardly inclined path to the stacking device. For example, the stackable objects are moved upward with the aid of a conveying belt to the entry for the stacking device and then travel downward again inside the stacking device, for example to the original level. Gravity and the inherent weight of the stackable objects can thus be used for the stack or bundle forming.

According to yet another modified embodiment of the invention, the stackable objects are pushed onto a first fork, located at the shaft entrance on the top. This fork is subsequently retracted and the flat object is transferred to a second fork, arranged at a lower location, wherein it is preferable if both forks can be extended and retracted. This modified embodiment results in a particularly high capacity for the bundle forming. In addition, forks of that type can be produced cheaply and operationally safe.

The method is especially suitable for forming bundles from print products such as books, newspapers, and pamphlets or brochures. In principle, the method is also suitable for use with other objects, in particular flat objects.

According to a further aspect of the invention there is provided a device for forming bundles from stackable objects, wherein according to an exemplary embodiment the device comprises at least one stacking device having a shaft with an upper region including an opening adapted to accept stackable objects; a first conveying apparatus to supply the stackable objects in a conveying direction toward the opening in the upper region of the shaft of the stacking device; and a second, different conveying apparatus to transport bundles formed inside the shaft away from the at least one stacking device.

With such a device, an intake opening is provided in the upper region of the shaft for receiving the stackable objects and the stacking device is provided with a mechanism for forming the bundles inside the shaft and for moving the bundles downward to a different conveying apparatus. A device of this type is distinguished by a particularly high capacity. The thickness of the stackable objects can differ and the objects can also differ in other ways. The device is preferably provided with several stacking devices to which the stackable objects can be selectively supplied. In particular, the device may include a control device for feeding the stackable objects to the stacking devices, such that bundles with substantially uniform thickness may be formed. The control device may also be used to form bundles where the objects are respectively assembled in a predetermined order. For example, it is possible to form bundles that meet route requirements for the objects such as magazines, catalogues, and the like by positioning these objects at a predetermined location in the stack.

According to a modified embodiment of the invention, the device comprises a measuring device for measuring the thicknesses of the stackable objects. This measuring device may be arranged on the first conveying apparatus, for example, in front of the stacking device and may use ultrasound, a laser, or a photo-electric cell for the measuring operation. Based on the obtained measuring values, the control device then controls the stackable objects to form suitable bundles.

It is particularly advantageous if the device according to the invention is used to form bundles with a substantially uniform thickness for palletizing, as well as to form bundles that meet route requirements for postal mail delivery.

BRIEF DESCRIPTION OF THE DRAWINGS

The above and other features and advantages of the invention will be further understood from the following detailed description of a preferred embodiment and with reference to the accompanying drawing, wherein.

DETAILED DESCRIPTION OF THE PREFERRED EMBODIMENTS

Figure 1:
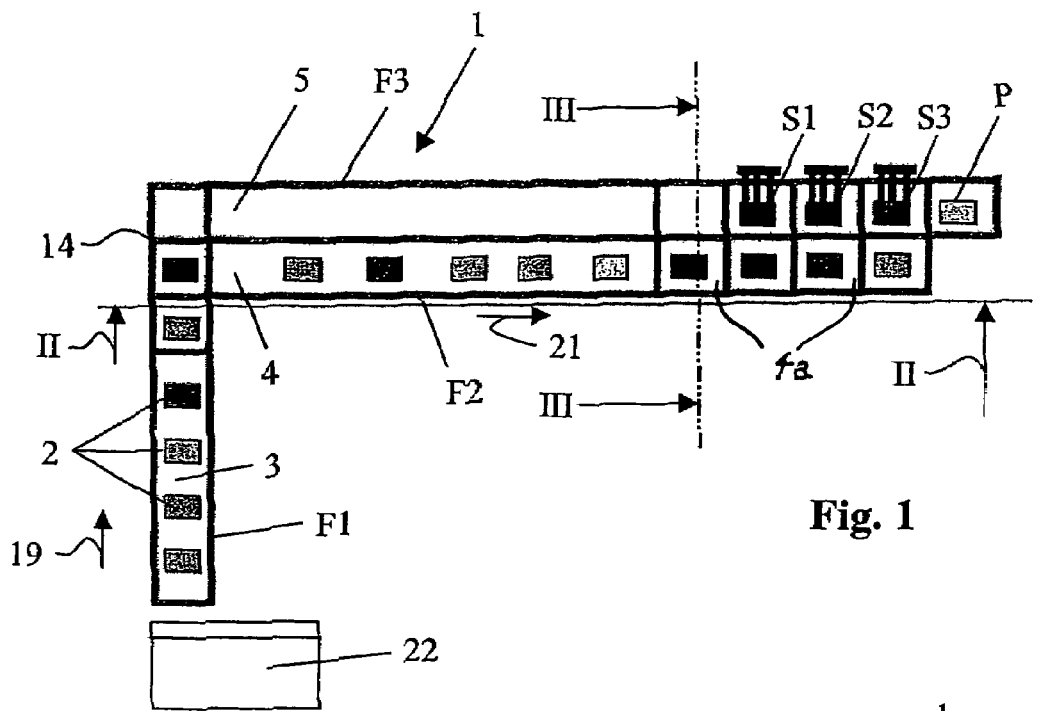
FIG. 1 shows a schematic view from the top of a device according to the invention.
Figure 2:
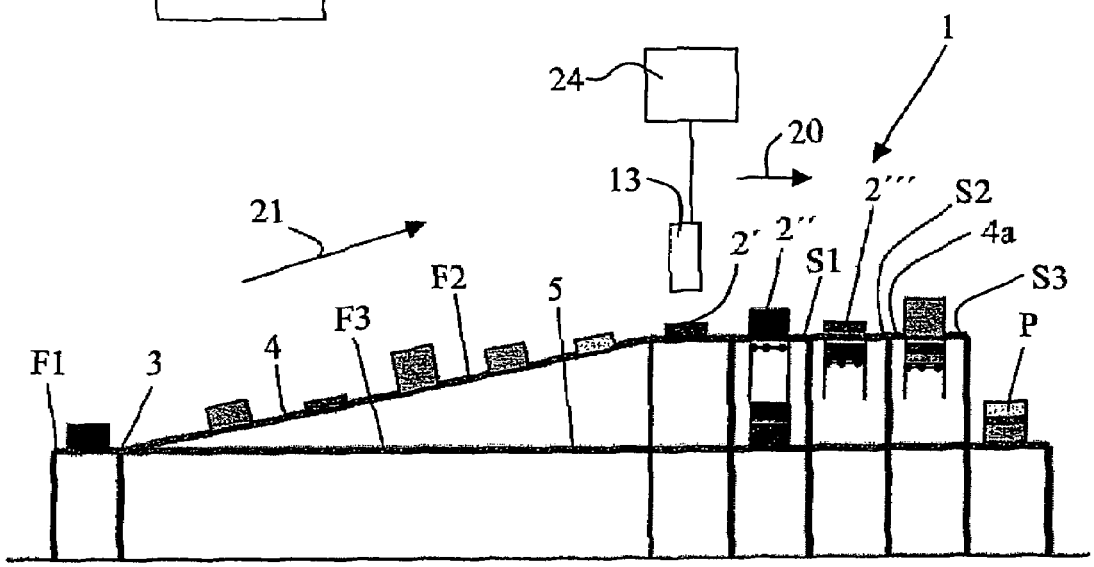
FIG. 2 shows a sectional view along line II-II in FIG. 1.

Referring to FIGS. 1 and 2, there is shown a device 1 which comprises a conveying apparatus F1, for example a belt conveyor provided with a transport element 3, which picks up objects 2 from a machine 22 such as a gathering and wire-stitching machine and conveys these objects essentially horizontally, as shown with arrow 19. The machine 22, for example, produces books, pamphlets, magazines and the like in a manner known per se. In principle, these objects 2 can also be different products such as products removed from a store and placed onto the conveying apparatus F1. Further conveying apparatuses F2 and F3 may be arranged transverse to the conveying apparatus F1, wherein the conveying apparatuses F2 and F3 may also be belt conveyors provided with transport element 4 and 5, respectively. At the reversing location 14, the objects 2 are deposited onto the conveying apparatus F2, wherein a pusher, not shown herein, is used to transfer the objects from the conveying apparatus F1 to the conveying apparatus F2 by pushing the respective objects 2 from the conveying apparatus F1 onto the conveying apparatus F2. The objects 2 may conceivably be directly deposited onto the conveying apparatus F2 so that the conveying apparatus F1 may be dispensed with. The objects 2 can furthermore be transferred by a bypass operation, mentioned later on, from the conveying apparatus F1 directly onto the conveying apparatus F3.

Arrow 21 in FIG. 2 shows that the conveying apparatus F2 conveys the objects 2 successively in a row along an upwardly moving path until a predetermined level is reached. The objects 2 are then transported horizontally along a section 4a, as shown with arrow 20. Thus, the objects 2 are initially transported in a horizontal direction by the transport element 3 and subsequently along an upwardly inclined path and then horizontally on the upper section 4a with the aid of the transport element 4. The transport element 5 of the conveying apparatus F3 extends essentially in a horizontal direction and is arranged offset relative to the transport element 4, as shown in FIG. 1.

A measuring device 13 for measuring the thicknesses of the objects 2 is provided at the start of section 4a, as shown in FIG. 2. The measuring data are fed to a control device 24, which controls the bundle-forming device. The thickness of the objects can differ, for example as shown with the objects 2', 2", and 2''' according to FIG. 2, wherein ultrasound, a laser, or other means can be used in a manner known per se for measuring the thickness. In principle, the thickness can also be measured at an earlier location, for example inside the machine 22.

Stacking devices S1, S2, and S3 are arranged along the section 4a, offset to the side, wherein these stacking devices S1, S2, and S3 are preferably embodied identically. In principle, a device is conceivable which comprises only one stacking device S or more than three stacking devices S.

Figures 3G, 3H:
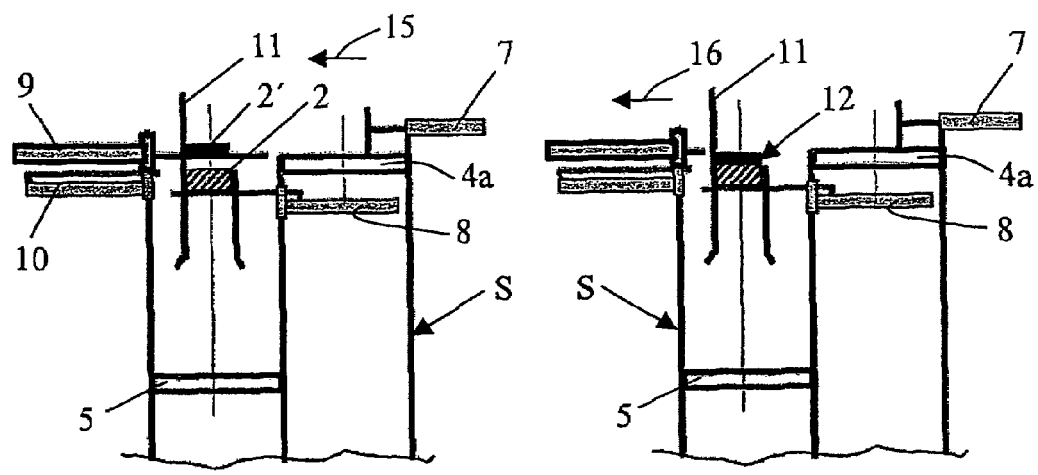
FIGS. 3a to 3p show separate sectional views along the line III-III in FIG. 1, wherein these views illustrate individual steps during the stack-forming process.
Figures 3I, 3J:
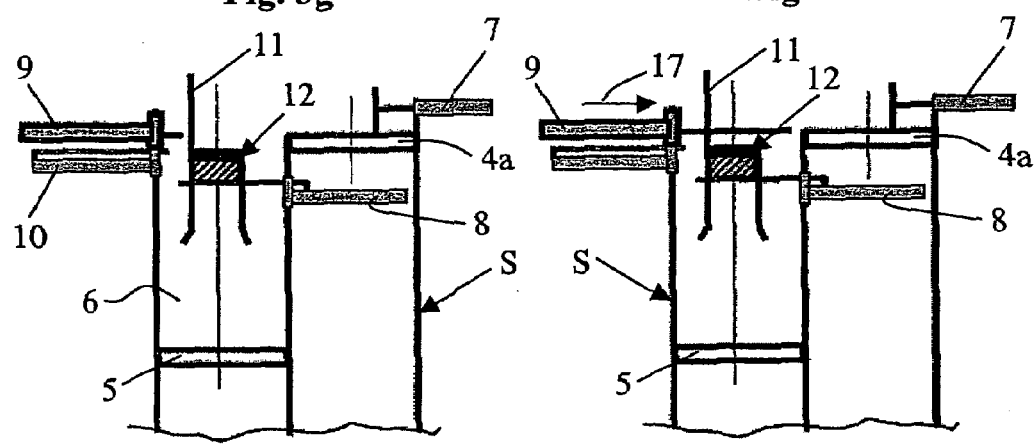
Figures 3K, 3L:
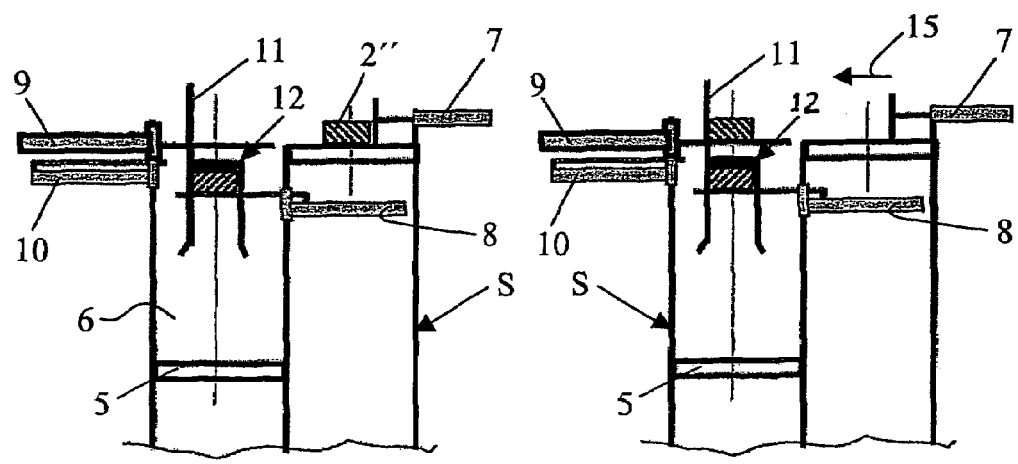
Figure 3M:
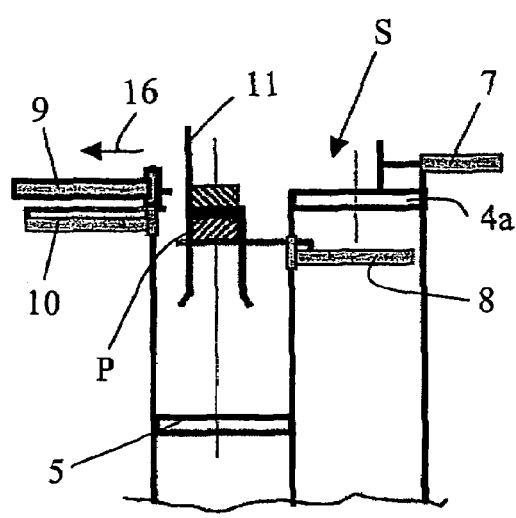
Figure 3N:
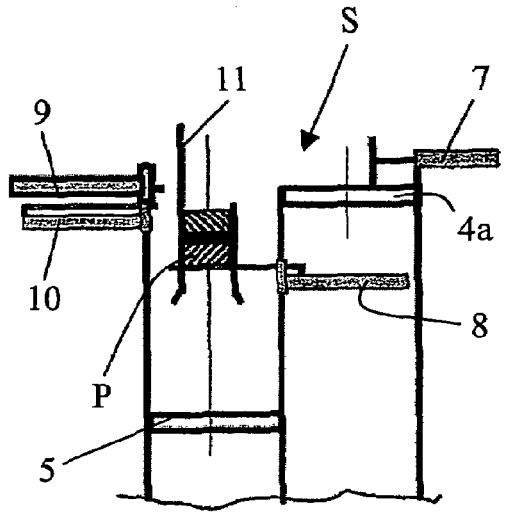
Figure 3O:
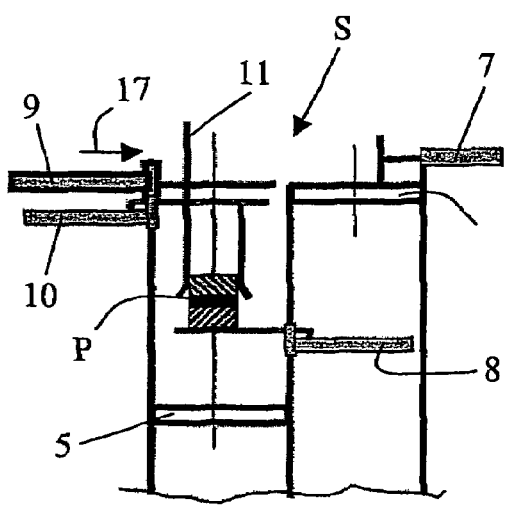
Figure 3P:
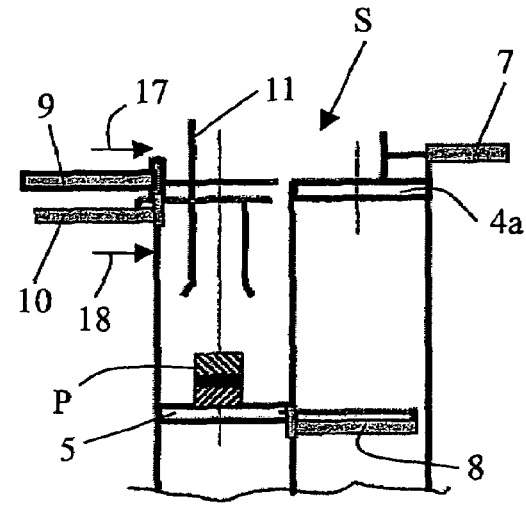

Referring to FIGS. 3a-3p, a pusher 7 is provided for each stacking device S. The pusher 7 comprises a pushing element 25 and a drive 26, for example a pneumatic cylinder. The objects 2 can be moved with the pusher 7 from the conveying apparatus F2 to the stacking devices S1, S2, or S3, wherein the movement is preferably in a horizontal direction and transverse to the conveying direction of the conveying apparatus F2 and thus also transverse to the direction of arrow 20. The movements are controlled in a suitable manner by the control device 24.

Each stacking device S comprises a shaft 6, which extends vertically downward from the top and comprises an opening 27 at the top, as shown in FIG. 3a. A first fork 8 and a second fork 9 are arranged on the level of the opening 27, wherein these forks can be extended and retracted pneumatically. FIG. 3a, for example, shows both forks 8 and 9 in the extended position. A third fork 10 is furthermore provided, which is arranged somewhat below the fork 9 and is retracted in FIG. 3a. As can be seen, the first fork 8 is arranged below the section 4a while the forks 9 and 10 are arranged on the other side of the opening 27. The section 4a is also located in the area surrounding the opening 27. The transporting element 5 is positioned below the opening 27, in a lower section of the shaft 6 and offset to the section 4a, as shown with FIG. 3a.

A guide 11 extends downward through the opening 27 inside each shaft 6. The guide 11 comprises a metal sheet, for example, which is provided with corresponding openings for the forks 8, 9 and 10.

The method is explained below in further detail with the aid of the FIGS. 3a to 3p.

With the method according to the invention, a bundle P is formed inside each shaft 6 of the respective stacking devices S1, S2 and S3. According to FIGS. 1 and 2, this bundle is conveyed further with the conveying apparatus F3, for example to a palletizing device that is not shown herein. At the start of the bundle forming, the forks 8 and 9 are extended as shown with FIG. 3a, meaning they extend into the opening 27 of the shaft 6. The object 2 is then pushed with the associated pusher 7 onto the second fork 9 until the object fits against the guide 11, which forms an end stop as shown in FIG. 3b. FIG. 3b shows the object 2 positioned on the fork 9. The direction for pushing the object 2 is indicated with arrow 15 in FIG. 3b, wherein the object 2 is moved and/or pushed at a right angle to the conveying direction of the conveying apparatus F2.

Once the object 2 is positioned as shown in FIG. 3b, the fork 9 is retracted in the direction of arrow 16, as shown in FIG. 3c. Owing to its inherent weight, the object 2 then drops down onto the first fork 8 that is extended, as shown in FIG. 3c while the object 2 is guided along the guide 11. The fork 8 is then moved downward by the control device 24 and a drive that is not shown herein, as indicated with arrow 23 in FIG. 3d. The distance for the downward movement of the first fork 8 depends on the measured thickness of the object 2. The first fork 8 is moved down far enough, so that the second fork 9 can be extended without coming in contact with the object 2. FIG. 3e shows that the second fork 9 is then extended in the direction of arrow 17 with the object 2 at rest on the first fork 8, below the fork 9.

Once a second object 2' has reached the stacking device S, as shown with FIG. 3f, this second object is pushed with the pusher 7 onto the extended second fork 9, as is indicated in FIG. 3g with the arrow 15. Once the object 2' is positioned on the second fork 9, the second fork 9 is retracted as shown with arrow 16 in FIG. 3h. Owing to its inherent weight and guided by the guide 11, the object 2' then drops down and comes to rest on the previously deposited object 2, thereby forming a first stack 12 and/or a partial bundle. The first fork 8 is then moved downward by the distance corresponding to the measured thickness of the object 2', wherein the stack 12 is guided by the guide 11.

A third object 2" is then pushed in the above-described manner onto the extended second fork 9, as shown with FIGS. 3k to 3m, and is subsequently deposited on the stack 12. The bundle P is then completed, as shown in FIG. 3n. The first fork 8 with the bundle P is then lowered down to the level of the transport element 5 and/or the level of the conveying apparatus F3.

During the lowering of the bundle P, the third fork 10 is extended as indicated in FIG. 3p with arrow 18. The third fork 10 at times assumes the function of the first fork 8, as long as the fork 8 is in the process of transferring the bundle P to the transport element 5, so that a new bundle can form while the previously formed bundle P is lowered. Once the bundle P is positioned on the transport element 5, as shown in FIG. 3p, the first fork 8 is retracted and moved upward again. The transfer of the bundle P to the transport element 5, preferably a continuously circulating belt, is preferably realized as described for the exemplary embodiment according to European patent document EP 1 491 477 A. The third fork 10 can be retracted once more since the second fork 8 again takes over the stack forming. The stack P is then conveyed further by the transport element 5 and is supplied, for example, to a palletizing machine to be palletized according to predetermined stacking patterns. The difference in the bundle thickness amounts to 3 to 4 cm, for example, wherein unfinished bundles P can be ejected.

The conveying apparatus F3 can also be used for a bypass operation, for transferring the objects 2 directly from the conveying apparatus F1 to the conveying apparatus F3. These objects consequently do not travel to one of the stacking devices S. Defective objects 2 can thus be removed, for example, or objects can be made available individually for the palletizing.

The device 1 according to the invention can also be used for producing bundles P that meet route requirements for postal shipments. For this, all objects 2 which are to be distributed along a specific postal route are assembled into a single bundle P that meets the requirements of a specific postal route. However, it is also possible to form bundles P composed of objects for sale at a kiosk or the like. The sequence and identification of the objects 2 and/or the print products in that case is preferably determined in the machine 22, before the objects reach the conveying apparatus F1, wherein suitable means for this are known to the person skilled in the art.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for forming bundles from stackable objects using a stacking device having a vertical shaft, a first fork, a second fork, and a third fork, the method comprising:
    supplying a first stackable object in a first conveying direction with a first conveying apparatus;
    measuring the thickness of the first stackable object;
    moving the first stackable object in a second direction traverse to the first conveying direction onto the second fork while the second fork is located at an upper opening of the vertical shaft;
    retracting the second fork and transferring the first stackable object onto the first fork while the first fork is located in the vertical shaft below the second fork;
    lowering the first fork within the vertical shaft by a distance corresponding to the thickness of the first stackable object;
    measuring the thickness of a second stackable object located upstream from the stacking device;
    stacking the second stackable object on top of the first stackable object to form a bundle from the bottom upward;
    lowering the first fork inside the vertical shaft by a distance corresponding to the thickness of the second stackable object;
    lowering the first fork within the vertical shaft while supporting the bundle;
    while lowering the first fork within the vertical shaft, extending the third fork at the upper opening of the vertical shaft;
    transferring the bundle from a lower section of the vertical shaft to a second conveying apparatus; and
    forming a new bundle on the third fork.

2. The method according to claim 1, including guiding the stackable objects inside the vertical shaft in a vertical direction with the aid of guiding mechanism.

3. The method according to claim 1, wherein the supplying step includes conveying the stackable objects by the first conveying apparatus along an upwardly inclined path to the stacking device.

4. The method according to claim 1, wherein moving step includes moving the stackable objects essentially horizontal to the stacking device.

5. The method according to claim 1, including providing the stackable objects as print products.

6. The method according to claim 1, further including assembling the objects into bundles having a substantially uniform thickness.

7. The method according to claim 6, wherein the assembling step includes assembling the objects into bundles which meet route requirements for a postal delivery.

8. The method according to claim 1, further comprising:
transferring the new bundle from the third fork to the second conveying apparatus;
retracting the third fork; and
forming another new bundle on the first fork while the first fork is located at the upper opening of the vertical shaft.

9. A device for forming bundles from stackable objects, comprising:
at least one stacking device comprising:
a vertical shaft with an upper region including an opening adapted to accept stackable objects, the vertical shaft further including a lower region;
a first fork adapted to extend and retract across the vertical shaft;
a second fork adapted to extend and retract across the vertical shaft, the second fork located above the first fork, wherein retraction of the second fork transfers the stackable objects from the second fork downward to the first fork inside the vertical shaft to form a bundle; and
a third fork adapted to extend and retract across the vertical shaft;
a first conveying apparatus angled upwardly to convey the stackable objects upward in a conveying direction toward the opening in the upper region of the vertical shaft;
a moving mechanism to move the stackable objects in a direction transverse to the conveying direction onto the second fork while the second fork is extended across the opening in the upper region of the vertical shaft; and
a second conveying apparatus located proximate the lower region of the vertical shaft to transport bundles formed inside the vertical shaft out from the lower region of the vertical shaft;
a measuring device located upstream of the stacking device, the measuring device adapted to take a thickness measurement of a first stackable object located on the first conveying apparatus and a second stackable object located on the first conveying apparatus upstream of the first stackable object;
a control device coupled to the measuring device and to the first fork, the second fork, and the third fork to control the first fork to move downward with the bundle by a vertical distance corresponding to the thickness measurement for the first stackable object, and a distance corresponding to a thickness measurement for the second stackable object located upstream of the first stackable object, the control device further controlling the third fork to extend across the opening of the vertical shaft to form a new bundle of stackable objects while the first fork moves downward with the bundle.

10. The device according to claim 9, wherein the at least one stacking device includes a plurality of stacking devices arranged along the first conveying apparatus.

11. The device according to claim 10, further including moving mechanisms each operatively arranged with a respective one of the stacking devices to displace the stackable objects essentially horizontally and transverse to the conveying direction of the conveying apparatus.

12. The device according to claim 9, further including an additional conveying apparatus arranged upstream of the first conveying apparatus and the second conveying apparatus, wherein the objects are selectively supplied to the first conveying apparatus, the second conveying apparatus, or the additional conveying apparatus.

13. A method of palletizing bundles having a substantially uniform thickness, comprising utilizing the apparatus according to claim 9.

14. A method for assembling bundles that meet route requirements for a postal delivery system, comprising utilizing the device according to claim 9.

* * * * *